United States Patent [19]

Juncker

[11] Patent Number: 5,359,482
[45] Date of Patent: Oct. 25, 1994

[54] MAGNETIC HEAD HAVING A SYSTEM OF WINDINGS FOR COMPENSATING MAGNETIC LEAKAGE

[75] Inventor: Richard Juncker, Chaville, France

[73] Assignee: Schlumberger Industries, Montrouge, France

[21] Appl. No.: 203,730

[22] Filed: Feb. 28, 1994

Related U.S. Application Data

[63] Continuation of Ser. No. 973,496, Nov. 9, 1992, abandoned.

[30] Foreign Application Priority Data

Nov. 8, 1991 [FR] France ............... 91 13772

[51] Int. Cl.⁵ .............................................. G11B 5/20
[52] U.S. Cl. ........................................................ 360/123
[58] Field of Search ........................... 360/123–124, 360/84

[56] References Cited

U.S. PATENT DOCUMENTS

| | | | |
|---|---|---|---|
| 3,143,603 | 8/1964 | Widener | 360/123 X |
| 3,480,736 | 11/1989 | Johnson et al. | 360/123 |
| 4,533,967 | 8/1985 | Conly et al. | 360/123 |
| 4,782,415 | 11/1988 | Vinal | 360/123 X |
| 4,816,950 | 3/1989 | Heinz et al. | 360/84 X |

FOREIGN PATENT DOCUMENTS

| | | | |
|---|---|---|---|
| 0412261 | 2/1991 | European Pat. Off. | |
| 2034164 | 2/1972 | Fed. Rep. of Germany | 360/123 |
| 84-12797 | 4/1986 | France | |
| 2571532 | 4/1986 | France | |
| 57-167113 | 10/1982 | Japan | 360/123 |

OTHER PUBLICATIONS

Patent Abstract of Japan, vol. 14, No. 191 (P-1038)(4134) Apr. 1990, #2-35610(A); Tanaka.
Patent Abstract of Japan, vol. 11, No. 342 Jun. 1987, #62-124617(A); Hayashi et al.
English Abstract of Japanese Application No. 2035610—Toshiba Corp. vol. 14, No. 191 (P-1038) (4134) Apr. 18, 1990—Title: Magnetic Head.
English Abstract of Japanese Application No. 62124617—Hitachi Ltd. vol. 11, No. 342 (P-635) (2789) Nov. 10, 1987—Title: Multigap Magnetic Head.

*Primary Examiner*—John H. Wolff
*Attorney, Agent, or Firm*—Sanford J. Asman

[57] ABSTRACT

A magnetic head for a digital signal comprises a double winding system in which each winding has one-half wound around a first branch of a U-shaped core and has its other half wound around a second branch so that when an appropriate electrical current is carried by the winding, a magnetic field is created such that the components thereof that are not channelled by the core cancel out giving rise to a zero resultant, while those channelled by the core add together.

3 Claims, 4 Drawing Sheets

MAGNETIC HEAD HAVING A SYSTEM OF WINDINGS FOR COMPENSATING MAGNETIC LEAKAGE

This application is a continuation of application Ser. No. 07/973,496, filed on Nov. 11, 1992, now abandoned, entitled A MAGNETIC HEAD HAVING A SYSTEM OF WINDINGS FOR COMPENSATING MAGNETIC LEAKAGE.

The present invention relates to a read and/or write magnetic head for a device of the digital video recorder type. It applies in particular to recording and/or reading a magnetic signal in a device of the type possessing a plurality of magnetic heads disposed close to one another and thus suffering from a risk of cross-talk due to magnetic leakage.

BACKGROUND OF THE INVENTION

Various types of magnetic head are known for writing and/or reading magnetic signals that correspond to digital data.

In the simplest embodiment, a magnetic head comprises a magnetic circuit or core of magnetic material, e.g. ferrite. The core is U-shaped and the ends of its two branches or arms meet across a gap in which a separator of non-magnetic material is positioned.

A winding is wound around the portion of the core that interconnects the two branches (the portion furthest from ne gap) or else around one of the branches. The winding may also be distributed over both branches.

One terminal of the winding is connected to the electronic read and/or write circuit and the other terminal of the winding is put to ground potential or is connected to another portion of the electronic circuit. For example, when writing, an electrical signal issued by the electronic write circuit travels through the winding, thereby generating a corresponding longitudinal magnetic field.

The magnetic field is channelled in the core. The leakage field created around the gap causes data to be recorded on a magnetic medium placed close to the gap.

When reading, the magnetic flux from the medium is diverted into the magnetic circuit and gives rise to electrical signal in the winding. The electrical signal is amplified and processed by the electronic read circuit.

This type of embodiment gives rise to electrical problems. That is why another type of magnetic head is used, as shown diagrammatically in FIG. 1.

Such known magnetic heads have a first winding 10 wound around one of the branches 12 of the U-shaped core, and a second winding 14 wound around the other branch 16 in identical manner to the first winding. These two windings are electrically interconnected at a midpoint 18 with the winding directions of the windings being such that a current flowing through the first winding towards the midpoint generates a magnetic field of the same intensity and in the opposite direction to the magnetic field generated by the same current flowing through the second winding, likewise towards the midpoint.

To obtain the desired result, i.e. to solve the above-mentioned electrical problems, the midpoint or connection 18 where the first winding 10 is connected to the second winding 14 is put to ground potential. Each winding is connected to a respective electronic read and/or write circuit (not shown) and is used independently of the other.

For example, when writing digital signals constituted by 0s and 1s, the first winding 10 is used for writing 0s whereas the second winding 14 is used for writing 1s, with the opposite-direction magnetic fields generated by the windings 10 and 14 corresponding to 0s and to 1s. The windings 10 and 14 are decoupled by the common midpoint 18 being put to ground potential.

Although a device of the above type is satisfactory from the electrical point of view, it suffers from drawbacks from the magnetic point of view.

In devices of that type, when a current flows through one or other of the windings, the magnetic field generated is not completely channelled within the core: magnetic leakage occurs, radiating outwards from the winding in question.

The intensity of this leakage radiation lies in the range 1/10000-th to 1/1000-th of the intensity of the magnetic field channelled by the magnetic circuit. Although weak, it is nevertheless sufficient to be detected by other magnetic heads placed in the vicinity thereof.

For example, FIG. 2 is a diagram of a turntable 20 having magnetic head supports 22 disposed at the periphery thereof. Devices of this type are used in "rotating head" type read/write mechanisms. Magnetic heads 24 dedicated to writing alternate with magnetic heads 26 dedicated to reading, and are therefore in the immediate vicinity thereof.

The distance between two magnetic heads 24 and 26 is of the order of a few millimeters to a few centimeters. Thus the leakage radiation emitted by a winding while writing can be read by an adjacent read head, thereby giving rise to crosstalk phenomena.

In known devices, to avoid such disturbing leakage radiation, each of the magnetic heads of a magnetic read/write mechanism is placed in a metal box (not shown in FIG. 2) that provides screening.

It will be understood that this prior art solution includes its own drawbacks. The screening box is an additional component that requires additional handling while it is being installed. The physical size of each head is considerably increased, and this can be highly disadvantageous in devices where maximum miniaturization is required. Finally, the metal screening box increases the cost of a magnetic head.

SUMMARY OF THE INVENTION

The object of the present invention is to mitigate these drawbacks. A magnetic head in accordance with the invention includes a system of windings such that the magnetic leakage observed at a certain distance compensates so as to give a zero resultant (coinciding to a few millimeters and in any event to less than the distance between two magnetic heads placed side by side in a read/write mechanism).

In this way, any risk of cross-talk is avoided and there is no need for a screening box.

More precisely, the present invention provides a magnetic head for a digital signal, the magnetic head comprising:

a substantially U-shaped core of magnetic material having two branches with their ends located facing each other to form a gap;

a separator of non-magnetic material placed in the gap; and a double winding system, each winding having one half wound around one of the branches of the core and having its other half wound around the other branch and, when an appropriate current flows through the winding, it is suitable for creating a magnetic field in a first direction in one half thereof and a magnetic field of the same intensity but in the opposite direction in the other half thereof.

Advantageously, one end of one half of one of the windings wound around one of the branches of the core is connected to one end of that half of the other winding which is wound around the other branch of the core so as to form a midpoint which is put to ground potential.

Preferably, the windings of the double winding system are identical.

BRIEF DESCRIPTION OF THE DRAWINGS

An embodiment of the invention is described by way of example with reference to the accompanying drawings, in which.

DETAILED DESCRIPTION

A magnetic read and/or write head in accordance with the invention is described below with reference to FIGS. 3 and 4.

Figure 1:
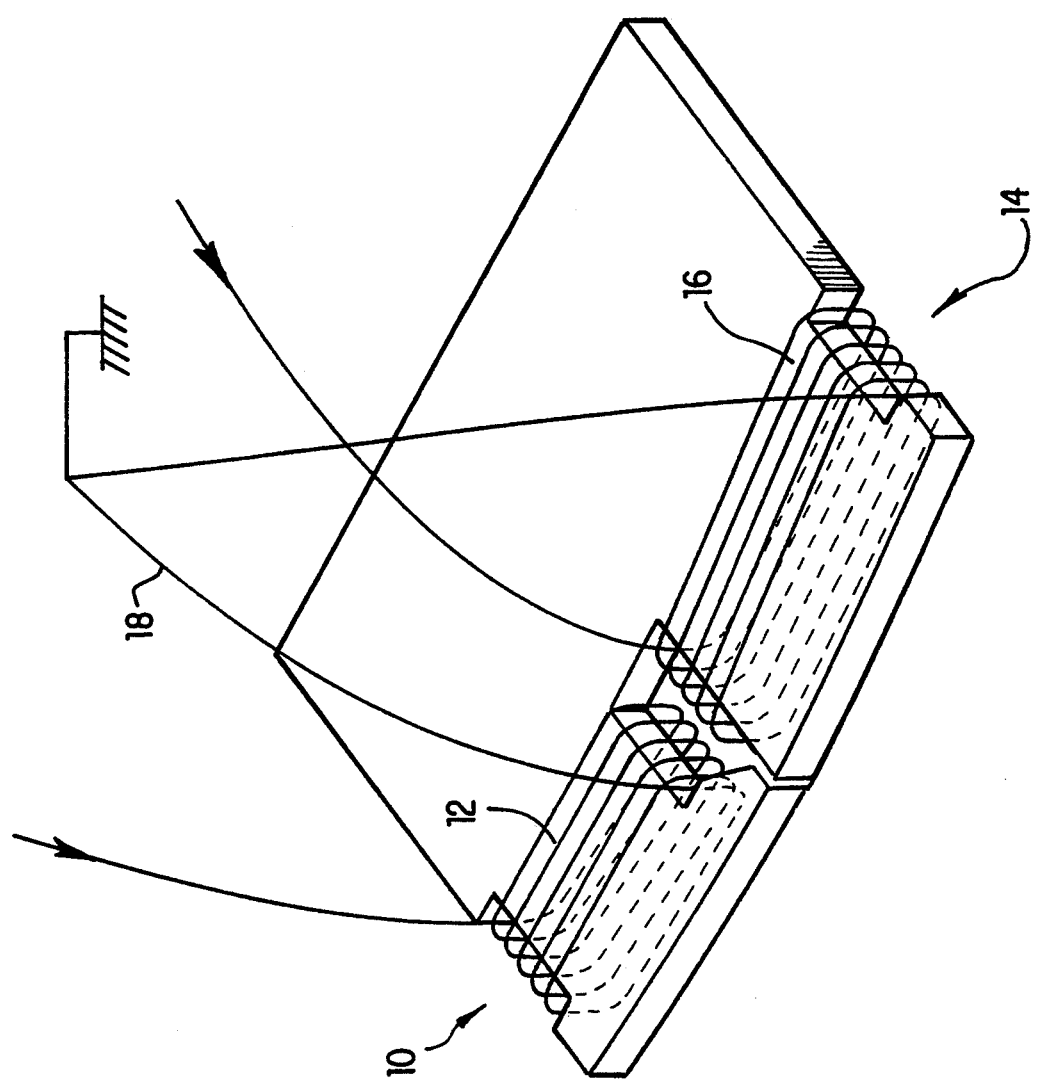
FIG. 1, as described above, is a diagram of a prior art head.
Figure 2:
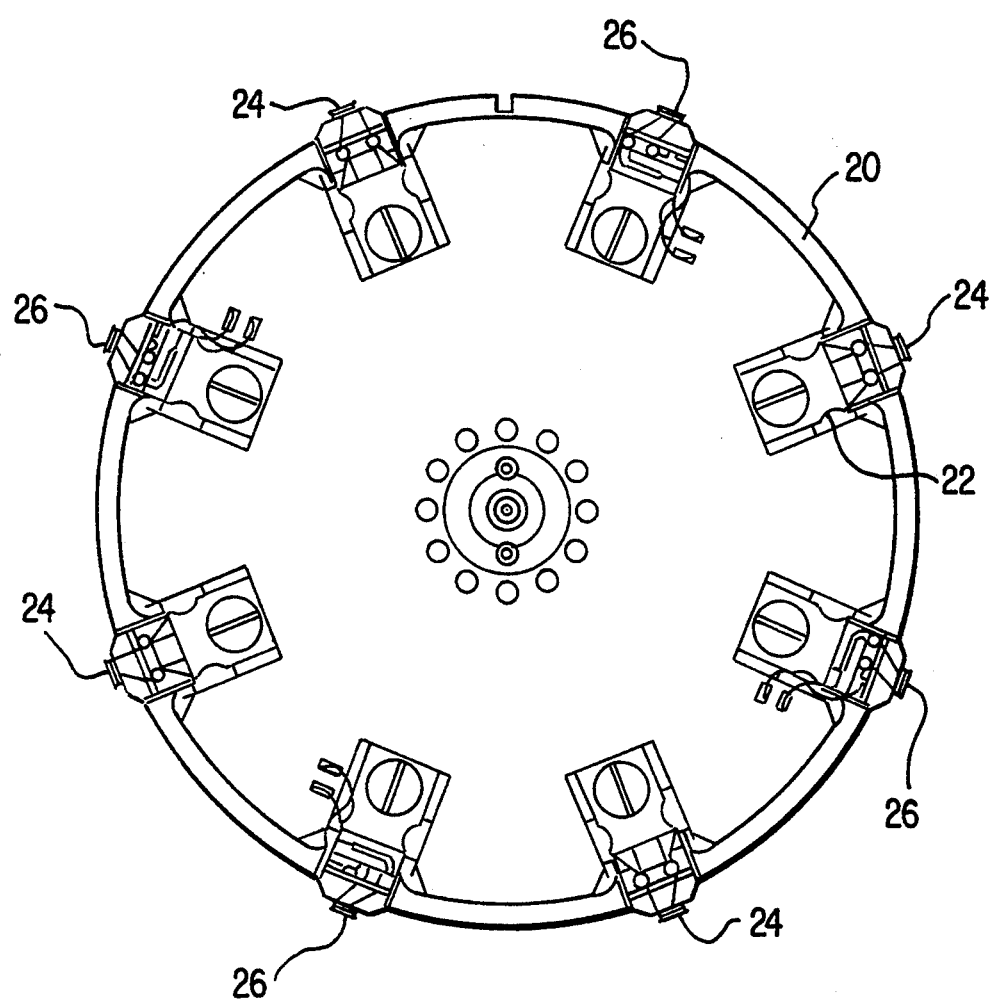
FIG. 2, as described above is a diagram of a set of magnetic heads supported by a rotary element in a "rotating head" read/write mechanism.
Figure 3:
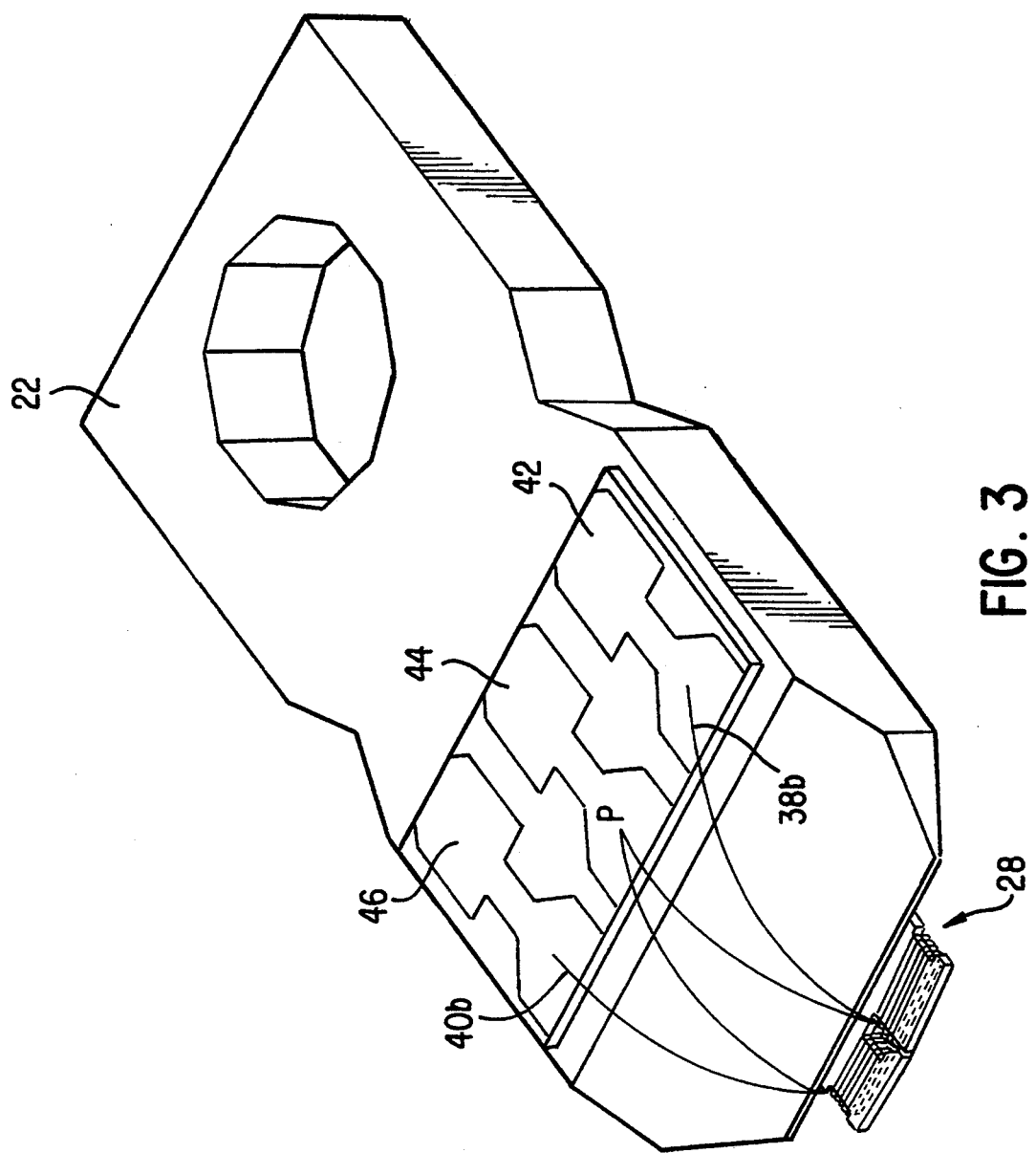
FIG. 3 is a diagram of a magnetic head in accordance with the invention mounted on a support.

FIG. 3 shows a magnetic head 28 fixed at the end of a support 22 suitable for mounting on a turntable. It will be understood that this type of mounting is described purely by way of example and that a magnetic head 28 in accordance with the invention could be mounted on any other type of support or could be mounted directly on a turntable.

Figure 4:
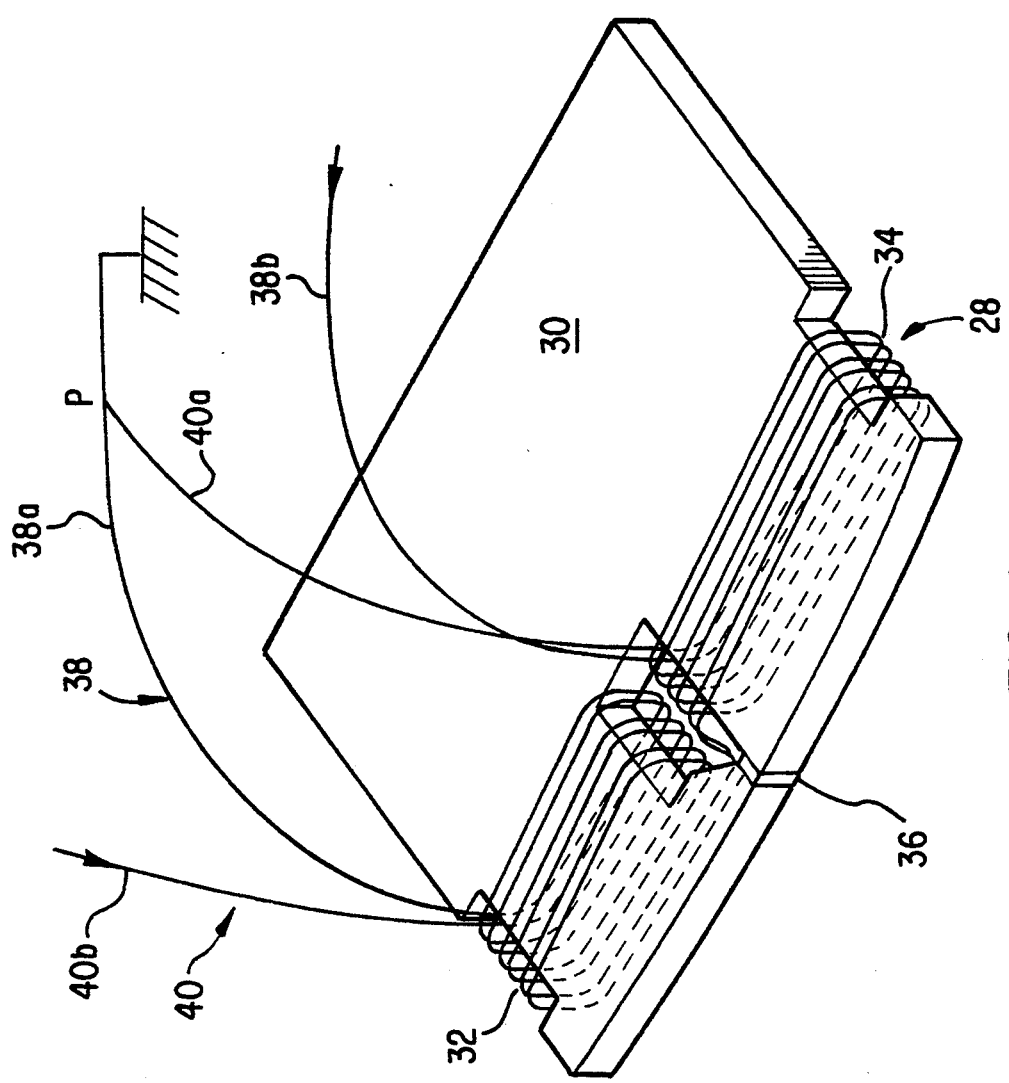
FIG. 4 is a diagram of a magnetic head in accordance with the invention.

FIG. 4 shows a magnetic head of the invention diagrammatically. The head comprises a core of magnetic material, e.g. ferrite. The core 30 is substantially U-shaped having two branches 32 and 34 whose ends are positioned to face each other and leave a gap in which a separator 36 of non-magnetic material is received, e.g. a separator made of glass.

Such a head is substantially square in shape having a side of 2 mm and a thickness of about 150 micrometers. The gap corresponds to a spacing of 0.8 micrometers, for example, and the separator 36 has a depth of about forty micrometers.

The winding system used in accordance with the invention is of the "double winding" type. It is constituted by two windings that are preferably identical and whose wires are respectively referenced 38 and 40. Each winding has one half wound around the first branch 32 and has its other half wound around the second branch 34. In this way, when the winding in question is carrying an appropriate electrical current a magnetic field is created in a first direction in the first branch 32 and a magnetic field of the same intensity but of opposite direction is created in the second branch 34.

In the example shown in FIG. 4, one end 38a of one half of the first winding 38 round around the branch 32 is connected to one end 40a of that half of the second winding 40 which is wound around the other branch 34, thereby creating a midpoint P which is put to ground potential.

The particular characteristics of the windings, such as the number of turns for example, depend on the intended application. For example, the number of turns in each half of each winding (i.e. wound on one of the branches) may be 5. The conductor wires 38 and 40 may be made of copper, for example, and may have a diameter of 40 micrometers.

As can be seen in FIG. 3, when the head 28 is fixed on the support 22, the free end 38b of the wire 38 is connected to a connection 42, the free end 40b of the wire 40 is connected to a connection 46, and the midpoint P is connected to a connection 44. The connections 42 and 46 make it easy to provide electrical connection with the electronic read and/or write circuits (not shown in FIG. 3), and the connection 44 makes grounding easy.

A magnetic head in accordance with the invention can be used for reading or for writing, depending on the type of electronic circuit to which it is connected. In prior art devices, the very in tense write signal gives rise to non-negligible magnetic leakage that is read like any other magnetic signal by the adjacent read heads, thereby running the risk of cross-talk.

With reference again to FIG. 4, a method of using a magnetic head of the invention for write purposes is described that avoids any risk of cross-talk.

When writing digital signals, one of the windings of the double winding system is used for writing 0s while the other winding is used for writing 1s.

When an appropriate current is delivered by an electronic write circuit (not shown in FIG. 4) it flows through one or other of the windings 38 or 40 and a magnetic field is created inside each half of the winding in question. The magnetic fields present in each half of the winding in question are equal in intensity but opposite in direction. The major portion of each of the magnetic fields is channelled inside the branches 32 and 34 of the core where the magnetic fields generated by each of the halves of the winding in question travel round the core in the same direction and where the components of the magnetic fields add.

Each of the halves of the winding also emits an interfering leakage magnetic field which is not channelled by the core 30. However, as seen from a distance of a few millimeters from the head 28, the resultant of the components of the magnetic fields coming from each of the two halves of the winding in question is zero. The components have the same intensity, and They are parallel, but they extend in opposite directions, thereby causing the magnetic leakage to cancel and thus making it possible to avoid cross-talk.

When reading a magnetic signal from a medium running past the magnetic head 28, a current corresponding to the magnetic signal flows in each of the windings which are then connected to amplifying read circuits (not shown in FIG. 4) that perform the usual processing.

I claim:

1. A magnetic head for a digital signal, the magnetic head comprising:
    a substantially U-shaped core of magnetic material having two branches with their ends located facing each other to form a gap;
    a separator of non-magnetic material placed in the gap; and
    a double coil system, each coil having one half wound in one sense around one of the branches of the core and having its other half wound in the opposite sense around the other branch, and when an appropriate current flows through each coil, it is suitable for creating, on the one hand, a first magnetic field in a first direction inside one half of said coil, a major portion of said first magnetic field being channelled inside one of the branches of the core whereas a minor portion of said first magnetic field constitutes a leakage magnetic field, and on the other hand, a second magnetic field of the same intensity but in the opposite direction inside the other half of said coil, a major portion of said second magnetic field being channelled inside the other branch of said core whereas a minor portion of said second magnetic field constitutes a leakage magnetic field, said major portions of said first and second magnetic fields channelled inside the branches travelling around said core and being added, said leakage magnetic fields of said first and second magnetic fields being observed at a certain distance compensate so as to give a zero resultant.

2. A magnetic head according to claim 1, wherein one end of one half of the coils wound around one of the branches of the core is connected to one end of the half of the other coil which is wound around the other branch of the core so as to form a midpoint which is put to ground potential.

3. A magnetic head according to claim 1, wherein the coils of the double coil system are identical.

* * * * *